United States Patent
Hearne

[15] 3,667,150
[45] June 6, 1972

[54] HOOKS FOR USE IN FISHING

[72] Inventor: Ian Keith Hearne, Wayside Langtoft, near Driffield, England

[22] Filed: June 9, 1970

[21] Appl. No.: 44,812

[30] Foreign Application Priority Data

Mar. 3, 1970   Great Britain...................10,035/70

[52] U.S. Cl. ................................................43/44.6
[51] Int. Cl. .............................................A01k 83/06
[58] Field of Search....................................43/44.6

[56] References Cited

UNITED STATES PATENTS

| | | |
|---|---|---|
| 2,215,612 | 9/1940 | Hathaway..............................43/44.6 |
| 2,900,755 | 8/1959 | Stinson.................................43/44.6 |
| 990,095 | 4/1911 | Balcom..................................43/44.6 |
| 3,047,977 | 8/1962 | Der-Hagopian....................43/44.6 X |

Primary Examiner—Samuel Koren
Assistant Examiner—Daniel J. Leach
Attorney—Stevens, Davis, Miller & Mosher

[57] ABSTRACT

A fishing hook having a shank and a hook end, and a gripping member positioned alongside the shank with the adjacent ends of the hook and gripping member attached to a ring. The free end of the gripping member is movable to and from a position adjacent the shank and at rest projects away from the shank. A separate member is slidable over the gripping member and shank to force them toward each other so that bait can be clamped therebetween.

3 Claims, 1 Drawing Figure

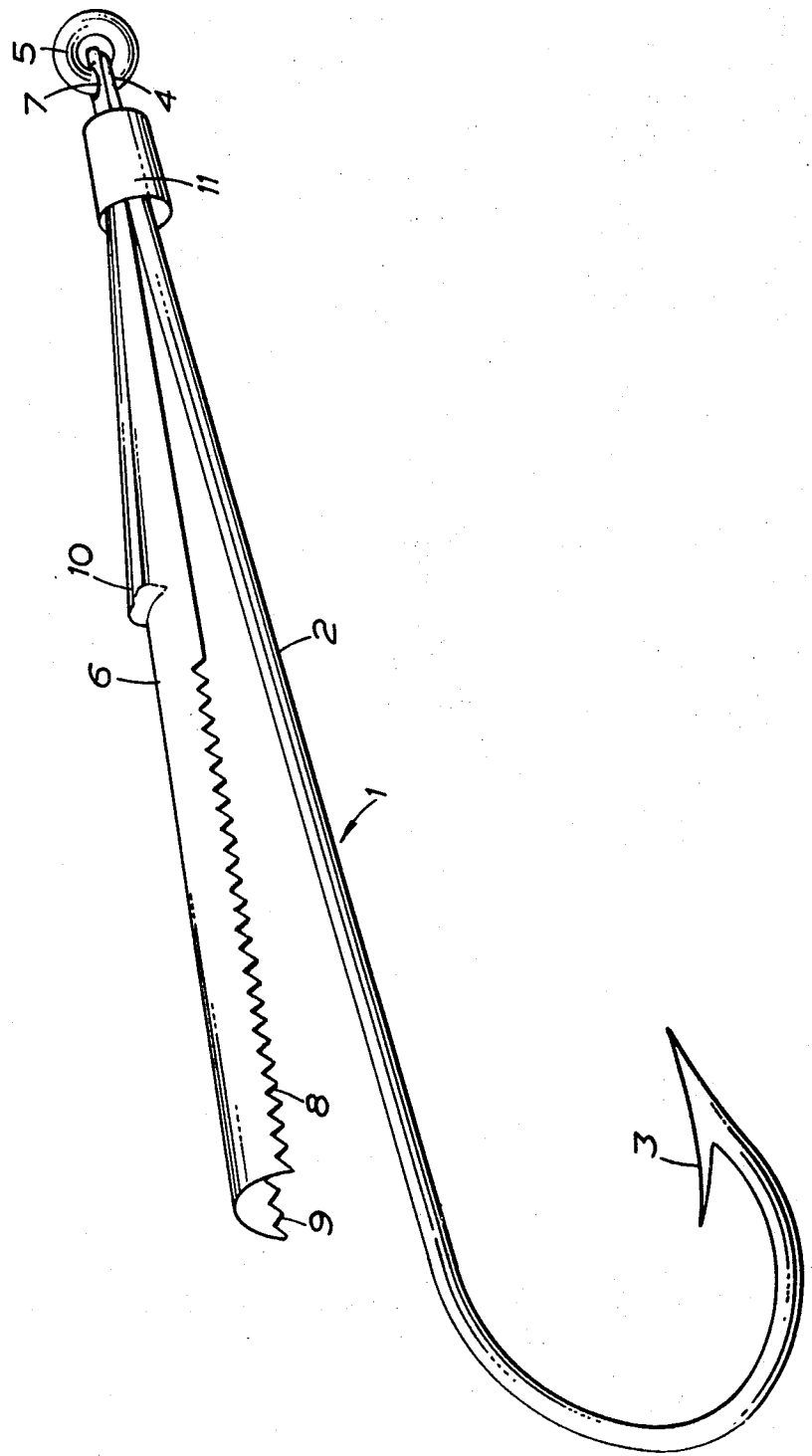

HOOKS FOR USE IN FISHING

This invention relates to hooks for use in fishing. Hooks at present in use are baited by piercing the bait with the hook. It is found that, particularly when fishing at sea, the bait may be pulled from the hook. In the fishing industry, large numbers of hooks are cast overboard, and it is laborious and time consuming to check all the hooks and lift any that have lost their bait. In practice, this is not done, and the hook is thus wasted for the duration of that cast. Further disadvantages of piercing the bait are that it takes up space on the hook and that live bait may well be killed when impaled. The movement of live bait provides an increased lure to fish, which is lost if the bait is killed.

According to the present invention a fishing hook comprises a hook member having a shank and hook end, and a gripping member movable to and from a position adjacent the shank, the arrangement being such that bait can be clamped between the gripping member and the shank.

Clamping of the bait in this way leaves the whole of the hook end free, reduces or eliminates the possibility of the bait being lost, even in rough water, and reduces the possibility of killing live bait.

The invention may be put into practice in any one of a number of ways. It is preferred that the hook member and the gripping member be separate elements, suspended by eyelets from a common ring to which the line may be attached. The gripping member may then be a steel strip or rod of similar thickness to that of the steel from which the hook member is formed. The side of the gripping member facing the shank is preferably roughened, e.g., by being serrated or notched, to increase the gripping power. The gripping member is conveniently of a similar length to the hook member. Means is provided for locking the gripping member in its gripping position or releasing it so that it may be moved away from the hook.

A particular embodiment of the invention will now be described in detail with reference to the accompanying drawing which is a perspective view of a fish hook.

As shown in the drawing the hook comprises a hook member 1 having a shank 2 and a hook end 3, the shank 2 terminating in an eyelet 4 received on a ring 5 to which a fishing line may be attached. A gripping member 6 of similar length to the hook member is also suspended from the ring 5 by means of an eyelet 7. The gripping member is of generally U-shaped cross section with the concave side of the U facing towards the shank so that the gripping member may lie closely against the shank. At the end remote from the eyelet 7 the two edges of the gripping member are formed with serrations 8 and 9. The opposite end of the gripping member is formed at its convex side with a raised section 10. A ferrule 11 surrounds both the shank 2 and the gripping member 6.

When the hook is to be baited the ferrule 11 is moved to its position close to the ring 5 as shown in the figure. The bait is then placed between the shank 2 and the serrated part of the gripping member 6 and the ferrule 11 is moved down from the ring. Engagement of the ferrule with the raised section 10 will cause the gripping member 6 to move towards the shank 2 and the bait will thus be clamped firmly between the gripping member and the hook member, the gripping member being retained in position by the wedging action between the raised section 10 and the ferrule 11. It will be seen that the bait is firmly held and the actual hook end 3 remains free.

In an alternative construction, the hook member and the gripping member may together constitute a crocodile clip, one or both members having a serrated surface, and the members being pivoted together and biased into engagement by a spring. Such a hook may be specially made, or an existing hook may be modified merely by welding a small crocodile clip to the shank thereof.

In a further construction the gripping member is a length of spring steel or other metal welded at one end, preferably the ring end, to the shank of the hook member so that it may be bent away from the shank for insertion of the bait, and will spring back towards the shank to grip the bait.

Other forms of screw or spring connections between the hook member and the gripping member can readily be devised.

It will be appreciated that the hook member and the gripping member can be made of any suitable materials in such a size as to suit the bait used and the anticipated catch.

What I claim is:

1. A fishing device comprising a bait attachment element to be removably associated with a fish hook, said bait attachment element comprising a gripping jaw of substantially U-shaped cross-section capable of partly surrounding the shank of a fish hook element, the linear edges of said jaw being serrated, said attachment element shaped so that the jaw at rest projects in an inclined plane from its tail end away from said shank, a wedge-like projection on the convex side of said jaw, means for connecting the tail ends of the two elements together, and separate slidable means slidably mounted over the jaw and shank tail ends for linear movement over the wedge-like projection for forcing the jaw towards the shank for the purpose of clamping bait between the two elements.

2. A fishing device as claimed in claim 1, wherein the tail ends of said fish hook shank and jaw are in the form of eyelets, and a ring is located through said eyelets holding the two elements together.

3. A fishing device as claimed in claim 1, wherein said slidable means on the jaw comprises a ferrule.

* * * * *